(12) United States Patent
Tan et al.

(10) Patent No.: US 10,003,777 B2
(45) Date of Patent: Jun. 19, 2018

(54) PROJECTION SCREEN FOR SPECULARLY REFLECTING LIGHT

(71) Applicant: Hewlett-Packard Development Company, L.P., Houston, TX (US)

(72) Inventors: Kar-Han Tan, Sunnyvale, CA (US); Bradley Neal Suggs, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 15/037,773

(22) PCT Filed: Nov. 21, 2013

(86) PCT No.: PCT/US2013/071240
§ 371 (c)(1),
(2) Date: May 19, 2016

(87) PCT Pub. No.: WO2015/076811
PCT Pub. Date: May 28, 2015

(65) Prior Publication Data
US 2016/0277719 A1    Sep. 22, 2016

(51) Int. Cl.
*H04N 9/31* (2006.01)
*G06F 3/042* (2006.01)
(Continued)

(52) U.S. Cl.
CPC ........... *H04N 9/3179* (2013.01); *G03B 21/60* (2013.01); *G06F 3/041* (2013.01); *G06F 3/0426* (2013.01);
(Continued)

(58) Field of Classification Search
CPC ............. G06T 7/11; G06T 2207/10048; G06T 2207/10024; G06T 7/0081; G06F 3/041;
(Continued)

(56) References Cited

U.S. PATENT DOCUMENTS 6,381,068 B1    4/2002    Harada et al.
6,618,076 B1    9/2003    Sukthankar et al.
(Continued)

FOREIGN PATENT DOCUMENTS

CN          1350648 A       5/2002

OTHER PUBLICATIONS

Gao, Rut et al; Microsoft Research-Mobile Surface; Microsoft Research; 2010; http://research.microsoft.com/en-us/projects/mobilesurface/ ~ 1 page.
(Continued)

*Primary Examiner* — Abhishek Sarma
(74) *Attorney, Agent, or Firm* — HP Inc. Patent Department

(57) ABSTRACT

Examples disclosed herein relate to determining a segmentation boundary based on an image representing an object. Examples include capturing, from an infrared (IR) camera disposed above and pointed at a projection screen, an IR image representing an object disposed between the IR camera and the projection screen, based on an intensity of IR light reflected by the object and the projection screen including a surface to specularly reflect IR light. Examples include determining a segmentation boundary based at least in part on at least one boundary between a first set of IR light intensity values and a second set of IR light intensity values, wherein the segmentation boundary represents at least one outer edge of the object based on the IR image.

14 Claims, 8 Drawing Sheets

(51) Int. Cl.
*G06K 9/20* (2006.01)
*G03B 21/60* (2014.01)
*G06F 3/041* (2006.01)
*H04N 5/33* (2006.01)
*G06T 7/11* (2017.01)
*G03B 21/10* (2006.01)

(52) U.S. Cl.
CPC ......... *G06K 9/2018* (2013.01); *G06K 9/2054* (2013.01); *G06T 7/11* (2017.01); *H04N 5/33* (2013.01); *G03B 21/10* (2013.01); *G06T 2207/10024* (2013.01); *G06T 2207/10048* (2013.01)

(58) Field of Classification Search
CPC ...... G06F 3/0426; H04N 9/3179; H04N 5/33; G03B 21/60; G03B 21/10; G06K 9/2018; G06K 9/2054
See application file for complete search history.

(56) References Cited

U.S. PATENT DOCUMENTS

| | | | |
|---|---|---|---|
| 7,023,536 | B2 | 4/2006 | Zhang et al. |
| 7,038,846 | B2 | 5/2006 | Mandella et al. |
| 7,088,440 | B2 | 8/2006 | Buermann et al. |
| 7,110,100 | B2 | 9/2006 | Buermann et al. |
| 7,113,270 | B2 | 9/2006 | Buermann et al. |
| 7,161,664 | B2 | 1/2007 | Buermann et al. |
| 7,203,384 | B2 | 4/2007 | Carl et al. |
| 7,268,956 | B2 | 9/2007 | Mandella et al. |
| 7,474,809 | B2 | 1/2009 | Carl et al. |
| 7,599,561 | B2 | 10/2009 | Wilson et al. |
| 7,710,391 | B2 | 5/2010 | Bell et al. |
| 7,729,515 | B2 | 6/2010 | Mandella et al. |
| 7,826,641 | B2 | 11/2010 | Mandella et al. |
| 7,961,909 | B2 | 6/2011 | Mandella et al. |
| 8,121,640 | B2 | 2/2012 | Russ et al. |
| 8,199,117 | B2 | 6/2012 | Izadi et al. |
| 8,736,583 | B2 | 5/2014 | Anderson et al. |
| 2005/0078092 | A1 | 4/2005 | Clapper |
| 2005/0168437 | A1 | 8/2005 | Carl et al. |
| 2005/0168448 | A1 | 8/2005 | Simpson |
| 2005/0200955 | A1* | 9/2005 | Ma ................. G03B 21/60 359/485.01 |
| 2008/0018591 | A1 | 1/2008 | Pittel et al. |
| 2009/0128499 | A1* | 5/2009 | Izadi ................. G06F 3/0425 345/173 |
| 2009/0219253 | A1 | 9/2009 | Izadi et al. |
| 2009/0309838 | A1 | 12/2009 | Adan et al. |
| 2010/0033683 | A1 | 2/2010 | Reichow et al. |
| 2011/0227876 | A1 | 9/2011 | Ilmonen |
| 2011/0227915 | A1 | 9/2011 | Mandella et al. |
| 2011/0242054 | A1 | 10/2011 | Tsu |
| 2011/0293180 | A1 | 12/2011 | Criminisi et al. |
| 2012/0013851 | A1* | 1/2012 | Liu ................. G03B 21/56 353/29 |
| 2012/0038549 | A1 | 2/2012 | Mandella et al. |
| 2012/0076353 | A1 | 3/2012 | Large |
| 2013/0077236 | A1 | 3/2013 | Becze et al. |
| 2013/0182077 | A1* | 7/2013 | Holz ................. H04N 5/232 348/46 |
| 2013/0194418 | A1 | 8/2013 | Gonzalez-Banos et al. |
| 2013/0257748 | A1 | 10/2013 | Ambrus et al. |
| 2013/0287257 | A1* | 10/2013 | Dedhia ................. G06K 9/3241 382/103 |

OTHER PUBLICATIONS

Hand, Randall; Infinite Z Launches zSpace Virtual Holographic 3D Display for Designers; VizWorld.com; Dec. 13, 2011; http://www.vizworld.com/ ~ 2 pages.

Harrison, B et al; Bringing Toys to Life: Intel Labs Oasis Project; Augmented Engineering; Jan. 26, 2011; http://augmentedengineering.wordpress.com/ ~ 1 page.

Harrison, C et al; OmniTouch: Wearable Multitouch Interaction Everywhere; UIST'11; Oct. 16, 2011; http://research.microsoft.com/ ~ 10 pages.

Hartmann, B et al; Pictionaire: Supporting Collaborative Design Work by Integrating Physical and Digital Artifacts: CSCW 2010; http://research.microsoft.com/ ~ 4 Pages.

Hinckley, K et al; Pen + Touch=New Tools; UIST'10; Oct. 3, 2010; http://research.microsoft.com/ ~ 10 pages.

Izadi, S et al; C-Slate: A Multi-Touch and Object Recognition System for Remote Collaboration Using Horizontal Surfaces; IEEE; 2007—8 pages.

Junuzovic, S eta:; Microsoft Research-IllumiShare; Microsoft Research; 2012; http://delivery.acm.org/ ~ 2 pages.

Kane, Shaun K. et al; Bonfire: A Nomadic System for Hybrid Laptop-Tabletop Interaction; UIST'09; Oct. 4, 2009; http://dub.washington.edu/ ~ 10 pages.

Linder, Natan et al; LuminAR: Portable Robotic Augmented Reality Interface Design and Prototype; UIST'10, Oct. 3, 2010; http://fluid.media.mit.edu/ ~ 2 pages.

Melanson, D; Microsoft Research Working on Portable Surface; Mar. 2, 2010; http://www.engadget.com/ ~ 2 pages.

Melanson, D; Wiimote Repurposed for Multi-Point Interactive Whiteboard; Dec. 10, 2007, http://www.engadget.com/ ~ 2 pages.

Shahram, etal., "C-Slate: A Multi-Touch and Object Recognition System for Remote Collaboration using Horizontal Surfaces;" IEEE International Workshop, 2007, 8 pgs.

Simonite, Tom; A Kitchen Countertop With a Bain; MIT Technology Review; Jul. 2, 2010; http://www.technologyreview.com/news ~ 2 pages.

Wilson, A et al; Combining Multiple Depth Cameras and Projectors for Interactions on Above, and Between Surfaces; UIST' 2010: http://research.microsoft.com/ ~ 10 pages.

Wilson, A.; Using a Depth Camera as a Touch Sensor; ITS 2010: Devices & Algorithms; Nov. 7, 2010; http://research.microsoft.com/ ~ 4 pages.

* cited by examiner

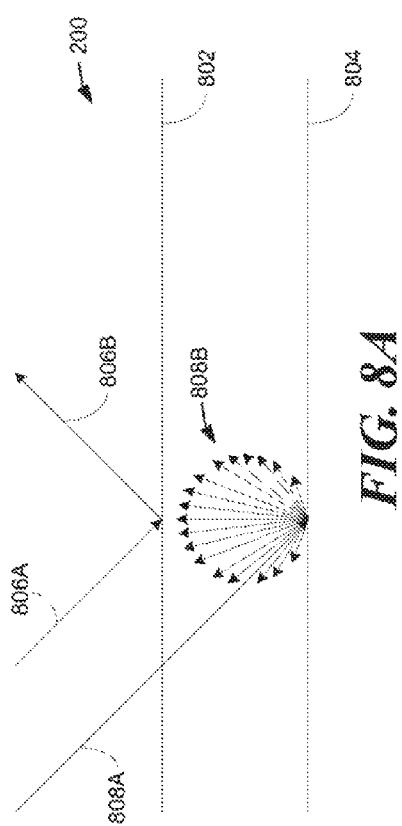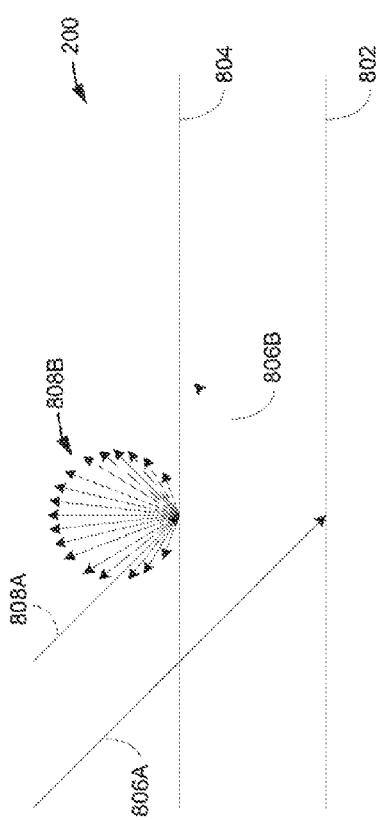

PROJECTION SCREEN FOR SPECULARLY REFLECTING LIGHT

BACKGROUND

Many computing systems include at least one display and at least one input device. The display may include, for example, a monitor, a screen, or the like. Example input devices include a mouse, a keyboard, a touchpad, or the like. Some computing systems include a touch-sensitive display to both display output of the computing system and receive physical (e.g., touch) input.

BRIEF DESCRIPTION OF THE DRAWINGS

The following detailed description references the drawings, wherein.

DETAILED DESCRIPTION

Figure 1:
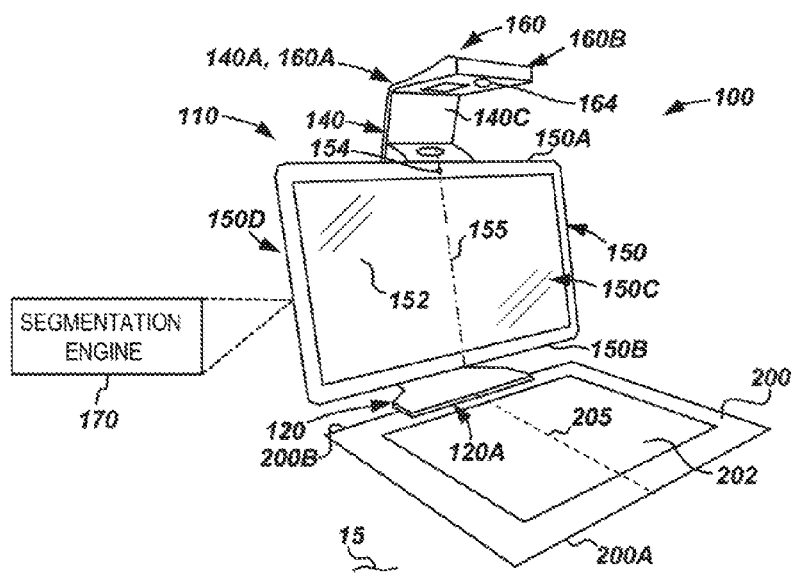
FIG. 1 is a schematic perspective view of an example computing system comprising a segmentation engine.

In addition to the input devices mentioned above, a camera is another example of an input device for a computing system. In some examples, a computing system may capture video or a still image with the camera. The video or still image may be stored or provided to another computing system via a suitable computer network. In other examples, an image captured by the camera may be analyzed, and the computing system may utilize the content of the image as input to the computing system. For example, the computing system may analyze an object represented in the captured image, and determine input to the computing system based on characteristics (e.g., location, position, orientation, shape, etc.) of the object represented in the image.

In such examples, the computing system may perform a process on the captured image to extract an image of at least one foreground object represented in the captured image. This process may be referred to herein as "segmentation". In some examples, the result of such a segmentation process may be an image of the foreground object separated from at least a background represented in the captured image. As an example, at least a portion of the background represented in the captured image may correspond to a surface, such as a projection screen, for reflecting image(s) projected from a projector assembly communicatively coupled to the computing system. The image(s) projected by the projector assembly may comprise information and/or images produced by software being executed by the computing system. In order to provide a sufficiently bright projected image onto the projection screen, the screen may be constructed with materials for diffusing light. As an example, the camera may be disposed above and pointed at the projection screen to capture an image representing an object disposed between the camera and the projection screen, based on light reflected by the object.

In some examples, a segmentation process may comprise determining a segmentation boundary for an object represented in a captured image. As used herein, a "segmentation boundary" for an object represented in an image may be information representing an estimate of which portion(s) of the image represent the object and which portion(s) of the image represent features other than the object, such as the projection screen. In some examples, a segmentation boundary for an object represented in an image may include information representing at least one outer edge of the object as represented in the image. When performing a segmentation process, a computing system may use the segmentation boundary to extract an image of the object from a larger captured image including, at least, a portion of the projection screen.

However, it may be difficult to accurately determine a segmentation boundary for an object disposed between the camera and the projection screen, as certain conditions may make it difficult to accurately distinguish the foreground object from the projection screen. For example, it may be difficult to accurately determine a segmentation boundary based on an image captured by a color camera (e.g., an RGB camera) in the presence of shadows, or when the foreground object and the projection screen are similar in color. As an example, an infrared (IR) camera may be used because an image captured by the IR camera may not be affected by either shadows or color similarity. However, when the projection screen is constructed with materials for diffusing light, which may include diffusing IR light, it may be difficult to accurately determine a segmentation boundary for an object that may also diffuse IR light. For example, by diffusing IR light the projection screen may not provide sufficient contrast when the computing system determines the segmentation boundary for a foreground object that also diffuses IR light.

To address these issues, examples described herein provide a projection screen that both specularly reflects IR light and diffuses visible light. By specularly reflecting IR light, for example, away from the IR camera disposed above and pointed at the projection screen, the projection screen may provide sufficient contrast when the computing system determines the segmentation boundary for a foreground object disposed between the IR camera and the projection screen, based on IR light reflected by the object. By diffusing visible light, the projection screen may provide a sufficiently bright image reflected from the projector assembly.

Examples described herein provide a projection screen including a first surface to specularly reflect IR light and a second surface to diffuse visible light. By using a projection screen including a first surface to specularly reflect IR light and a second surface to diffuse visible light may allow the computing system to more accurately determine a segmentation boundary for an object disposed between the screen and an IR camera. In addition, the projection screen may provide a sufficiently bright image reflected from the projector assembly.

Referring now to the drawings, FIGS. 1-7 are schematic views of an example computing system 100 comprising a segmentation engine 170. In some examples, segmentation engine 170 may determine a segmentation boundary representing at least one outer edge of an object based on a captured IR image, as described above. In the example of FIGS. 1-7, system 100 generally comprises a support structure 110, a computing device 150, a projector unit 180, and a projection screen 200 including a first surface to specularly reflect IR light and a second surface to diffuse visible light.

Computing device 150 may comprise any suitable computing device complying with the principles disclosed herein. As used herein, a "computing device" may comprise an electronic display device, a smartphone, a tablet, a chip set, an all-in-one computer (e.g., a device comprising a display device that also houses processing resource(s) of the computer), a desktop computer, a notebook computer, workstation, server, any other processing device or equipment, or a combination thereof. In this example, device 150 is an all-in-one computer having a central axis or center line 155, first or top side 150A, a second or bottom side 150B axially opposite the top side 150A, a front side 150C extending axially between sides 150A and 150B, a rear side 150D also extending axially between sides 150A and 150B and generally radially opposite front side 150C. A display 152 is disposed along front side 150C and defines a viewing surface of computing system 100 to display images for viewing by a user of system 100. In examples described herein, a display may include components of any technology suitable for displaying images, video, or the like.

In some examples, display 152 may be a touch-sensitive display. In examples described herein, a touch-sensitive display may include, for example, any suitable technology (e.g., components) for displaying images, video, or the like, and may include any suitable technology (e.g., components) for detecting physical contact (e.g., touch input), such as, for example, a resistive, capacitive, surface acoustic wave, infrared (IR), strain gauge, optical imaging, acoustic pulse recognition, dispersive signal sensing, or in-cell system, or the like. In examples described herein, display 152 may be referred to as a touch-sensitive display 152. Device 150 may further include a camera 154, which may be a web camera, for example. In some examples, camera 154 may capture images of a user positioned in front of display 152. In some examples, device 150 may also include a microphone or other device to receive sound input (e.g., voice input from a user).

Figure 2:
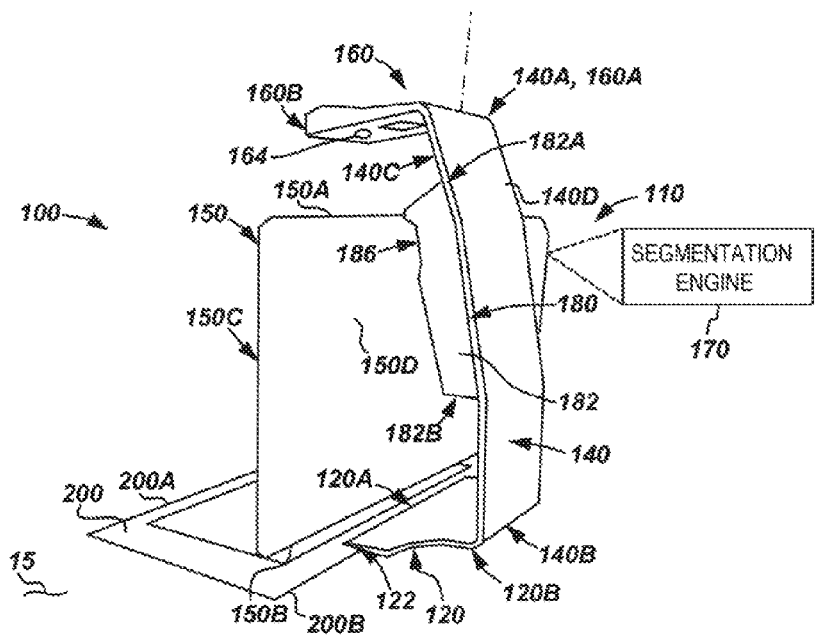
FIG. 2 is another schematic perspective view of the example computing system of FIG. 1.

In the example of FIGS. 1-7, support structure 110 includes a base 120, an upright member 140, and a top 160. Base 120 includes a first or front end 120A, and a second or rear end 120B. Base 120 may engage with a support surface 15 to support the weight of at least a portion of the components of system 100 (e.g., member 140, unit 180, device 150, top 160, etc.). In some examples, base 120 may engage with support surface 15 in this manner when system 100 is configured for operation. In the example of FIGS. 1-7, front end 120A of base 120 includes a raised portion 122 that may be disposed above and separated from support surface 15 (creating a space or clearance between portion 122 and surface 15) when base 120 is disposed on support surface 15 as illustrated in FIG. 2, for example. In such examples, a portion of a side of projection screen 200 may be disposed in (e.g., received within) the space formed between portion 122 and surface 15. In such examples, placing a portion of screen 200 within the space created by portion 122 and surface 15 may assist with the proper alignment of screen 200. In other examples, other suitable methods or devices may be used to assist with the alignment of screen 200.

Upright member 140 includes a first or upper end 140A, a second or lower end 140B opposite the upper end 140A, a first or front side 140C extending between the ends 140A and 140B, and a second or rear side 140D opposite the front side 140C and also extending between the ends 140A and 140B. Lower end 140B of member 140 is coupled to rear end 120B of base 120, such that member 140 extends substantially upward from support surface 15.

Top 160 includes a first or proximate end 160A, a second or distal end 160B opposite the proximate end 160A, a top surface 160C extending between ends 160A and 160B, and a bottom surface 160D opposite the top surface 160C and also extending between ends 160A and 160B. Proximate end 160A of top 160 is coupled to upper end 140A of upright member 140 such that distal end 160B extends outward from upper end 140A of upright member 140. As such, in the example shown in FIG. 2, top 160 is supported at end 160A (and not at end 160B), and may be referred to herein as a cantilevered top. In some examples, base 120, member 140, and top 160 may be monolithically formed. In other examples, two or more of base 120, member 140, and top 160 may be formed of separate pieces (I.e., not monolithically formed).

Projection screen 200 may include a central axis or centerline 205, a first or front side 200A, and a second or rear side 200B axially opposite the front side 200A. In the example of FIGS. 1-7, screen 200 may comprise a touch-sensitive region 202 substantially aligned with axis 205. Region 202 may comprise any suitable technology for detecting physical contact (e.g., touch input), as described above (e.g., capacitive touch mat). For example, touch-sensitive region 202 may comprise any suitable technology for detecting (and in some examples tracking) one or multiple touch inputs by a user to enable the user to interact, via such touch input, with software being executed by device 150 or another computing device. In the example of FIGS. 1-7, region 202 extends over less than all of screen 200. In other examples, region 202 may extend over substantially all of screen 200 (e.g., may be substantially coterminous with screen 200).

In examples described herein, projection screen 200 may be any suitable planar object, such as a mat (e.g., a touch-sensitive mat), tabletop, sheet, etc. In some examples, projection screen 200 may be disposed horizontal (or approximately or substantially horizontal). For example, screen 200 may be disposed on support surface 15, which may be horizontal (or approximately or substantially horizontal).

Figure 8A:
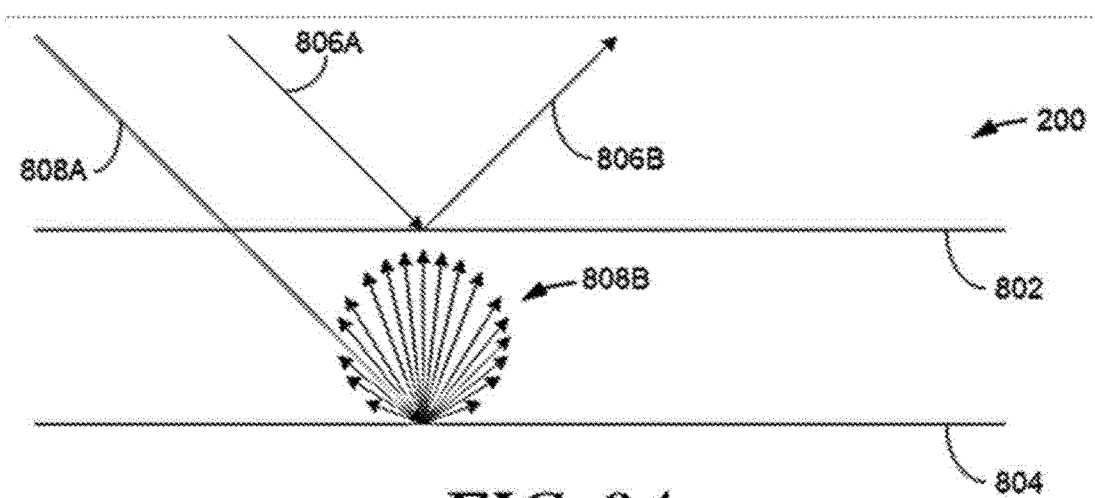
FIGS. 8A-B are schematic views of a projection screen of the example computing system of FIG. 1.
Figure 8B:
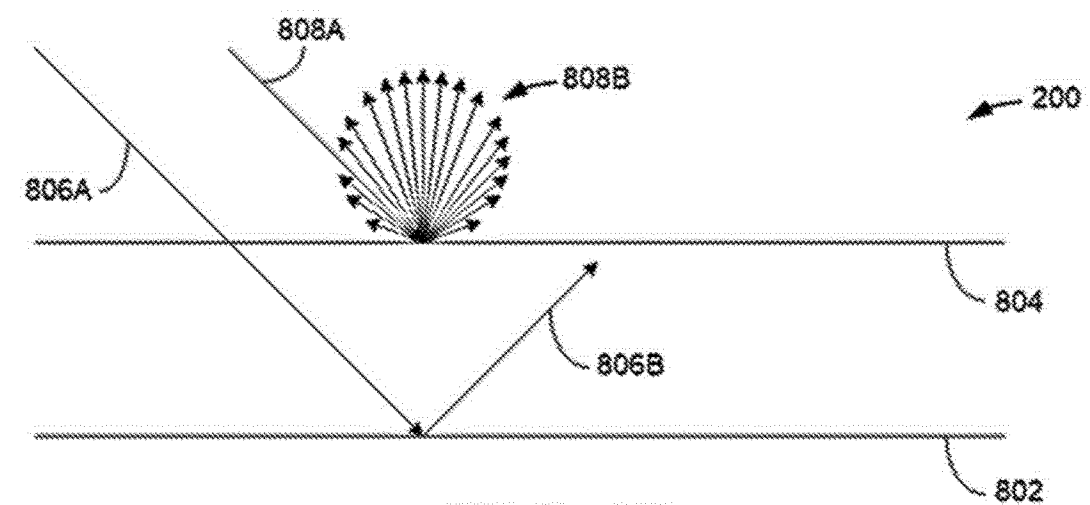

Referring to FIGS. 8A-B, the screen 200 may include a first surface 802 to specularly reflect IR light and a second surface 804 to diffuse visible light (e.g., in a broad range of directions). As an example, the screen 200 may be a dielectric mirror, which may include multiple layers of dielectric material deposited on optical material, such as glass. By choosing the appropriate dielectric layers, and the thickness of each layer, a particular coating with a specified reflectivity may be designed at different wavelengths of light. As an example, referring to FIG. 8A, a top dielectric layer may correspond to the first layer 802 to specularly reflect IR light, and another dielectric layer below the top layer may correspond to the second layer 804 to diffuse visible light. As an example, the first surface 802 of the screen 200 may include a hot mirror, which may reflect infrared light, while allowing visible light to pass through the first surface, and the second surface 804 of the screen 200 may include a cold mirror, which may reflect visible light while allowing infrared light to pass through the second surface.

In order to specularly reflect IR light, the first surface 802 may be a highly reflective surface (e.g., mirror-like). As a result, IR light 806A projected toward screen 200 from a single incoming direction may be reflected into a single outgoing direction (indicated as 806B). As will be further discussed, by specularly reflecting IR light (instead of diffusing IR light), the screen 200 may provide sufficient contrast when the computing system 150 determines a segmentation boundary for a foreground object disposed between an IR camera and the screen 200. With regards to diffusing visible light (e.g., visible light 808A projected from projector unit 180), the second surface 804 may be an appropriate surface for reflecting visible light in a broad range of directions (indicated as 808B). As a result, the screen 200 may provide a sufficiently bright image reflected from the projector unit 180.

Referring to FIGS. 8A-B, the first surface 802 of the screen 200 may be disposed above or below the second surface 804. When the first surface 802 is disposed above the second surface 804 (see FIG. 8A), visible light reflected or diffused from the second surface 804 may pass through the first surface 802.

As described above, screen 200 may be aligned with base 120 of structure 110 to assist with proper alignment of screen 200 (e.g., at least during operation of system 100). In the example of FIGS. 1-7, rear side 200B of screen 200 may be disposed between raised portion 122 of base 120 and support surface 15, such that rear end 200B is aligned with front side 120A of base 120 to assist with proper overall alignment of screen 200 (and particularly proper alignment of region 202) with other components of system 100. In some examples, screen 200 may be aligned with device 150 such that the center line 155 of device 150 is substantially aligned with center line 205 of screen 200. In other examples, screen 200 may be differently aligned with device 150.

In some examples, region 202 of screen 200 and device 150 may be communicatively connected (e.g., electrically coupled) to one another such that user inputs received by region 202 may be communicated to device 150. Region 202 and device 150 may communicate with one another via any suitable wired or wireless communication technology or mechanism, such as, for example, WI-FI, BLUETOOTH, ultrasonic technology, electrical cables, electrical leads, electrical conductors, electrical spring-loaded pogo pins with magnetic holding force, or the like, or a combination thereof. In the example of FIGS. 1-7, exposed electrical contacts disposed on rear side 200B of screen 200 may engage with corresponding electrical pogo-pin leads within portion 122 of base 120 to communicate information (e.g., transfer signals) between device 150 and region 202 during operation of system 100. In such examples, the electrical contacts may be held together by adjacent magnets (located in the clearance between portion 122 of base 120 and surface 15) to magnetically attract and hold (e.g., mechanically) a corresponding ferrous and/or magnetic material disposed along rear side 200B of screen 200.

Figure 3:
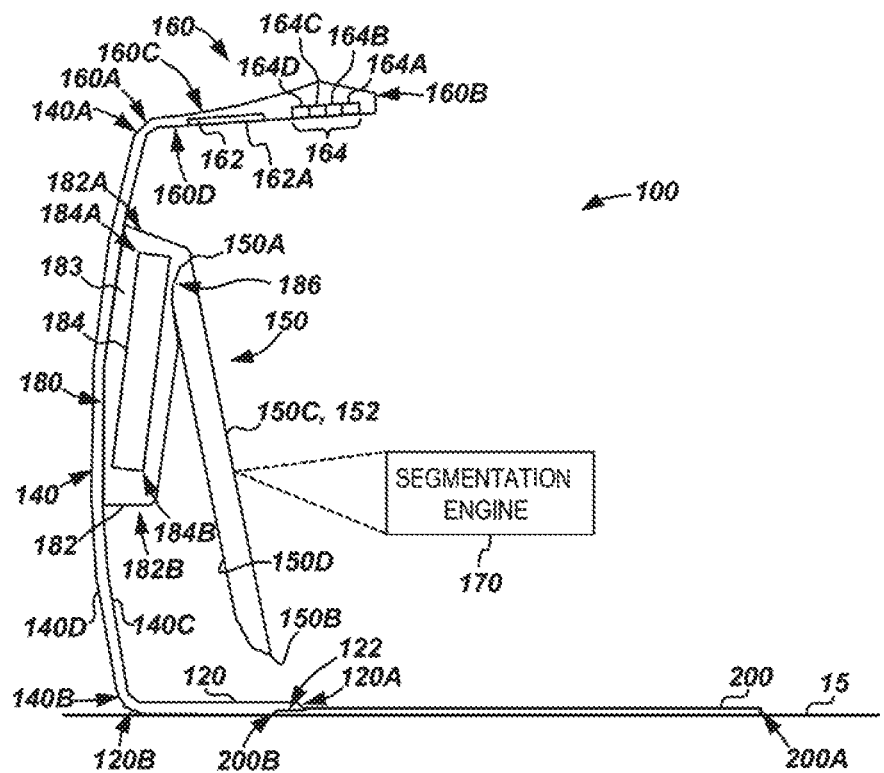
FIG. 3 is a schematic side view of the example computing system of FIG. 1.

Referring to FIG. 3, projector unit 180 comprises an outer housing 182, and a projector assembly 184 disposed within housing 182. Housing 182 includes a first or upper end 182A, a second or lower end 182B opposite the upper end 182A, and an inner cavity 183. In the example of FIG. 3, housing 182 further includes a coupling or mounting member 186 to engage with and support device 150 (e.g., at least during operation of system 100). Member 186 may be any suitable mechanism or device for suspending and supporting any suitable computing device 150 as described herein. For example, member 186 may comprise a hinge that includes an axis of rotation such that device 150 may be rotated (e.g., by a user) about the axis of rotation to attain a desired angle for viewing display 152. In some examples, device 150 may permanently or semi-permanently attached to housing 182 of unit 180. In some examples, housing 180 and device 150 may be integrally or monolithically formed as a single unit.

Figure 4:
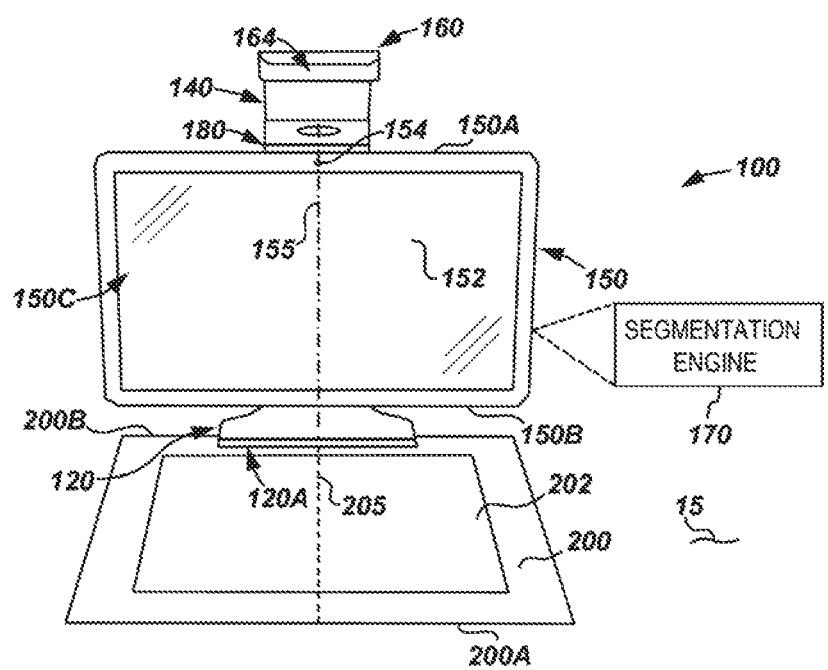
FIG. 4 is a schematic front view of the example computing system of FIG. 1.

Referring to FIG. 4, in some examples, when device 150 is suspended from structure 110 via mounting member 186 on housing 182, projector unit 180 (i.e., both housing 182 and assembly 184) may be substantially hidden behind device 150 when system 100 is viewed from the front (i.e., substantially facing display 152 disposed on front side 150C of device 150). In addition, as shown in FIG. 4, when device 150 is suspended from structure 110 as described above, projector unit 180 (i.e., both housing 182 and assembly 184) and any image projected thereby may be substantially aligned or centered with respect to center line 155 of device 150.

Referring again to FIG. 3, projector assembly 184 is disposed within cavity 183 of housing 182, and includes a first or upper end 184A, a second or lower end 184B opposite the upper end 184A. Upper end 184A is proximate upper end 182A of housing 182 while lower end 184B is proximate lower end 182B of housing 182. Projector assembly 184 may comprise any suitable digital light projector assembly for receiving data from a computing device (e.g., device 150) and projecting image(s) (e.g., out of upper end 184A) that correspond with that input data. For example, in some implementations, projector assembly 184 may comprise a digital light processing (DLP) projector or a liquid crystal on silicon (LCoS) projector which are advantageously compact and power efficient projection engines capable of multiple display resolutions and sizes, such as, for example, standard XGA resolution (1024×768 pixels) with a 4:3 aspect ratio, or standard WXGA resolution (1280×800 pixels) with a 16:10 aspect ratio. Projector assembly 184 is further communicatively connected (e.g., electrically coupled) to device 150 in order to receive data therefrom and to produce (e.g., project) light and image(s) from end 184A based on the received data. Projector assembly 184 may be communicatively connected to device 150 via any suitable type of electrical coupling, for example, or any other suitable communication technology or mechanism described herein. In some examples, assembly 184 may be communicatively connected to device 150 via electrical conductor(s), WI-FI, BLUETOOTH, an optical connection, an ultrasonic connection, or a combination thereof. In the example of FIGS. 1-7, device 150 is communicatively connected to assembly 184 through electrical leads or conductors (e.g., as described above in relation to screen 200 and base 120) disposed within mounting member 186 such that, when device 150 is suspended from structure 110 through member 186, the electrical leads disposed within member 186 contact corresponding leads or conductors disposed on device 150.

Referring still to FIG. 3, top 160 further includes a fold mirror 162 and a sensor bundle 164. Mirror 162 includes a highly reflective surface 162A that is disposed along bottom surface 160D of top 160 and is positioned to reflect light, image(s), etc., projected from upper end 184A of projector assembly 184 toward screen 200 during operation. Mirror 162 may comprise any suitable type of mirror or reflective surface. In the example of FIGS. 1-7, fold mirror 162 may comprise a standard front surface vacuum metalized aluminum coated glass mirror that acts to fold light emitted from assembly 184 down to screen 200. In other examples, mirror 162 may have a complex aspherical curvature to act as a reflective lens element to provide additional focusing power or optical correction.

Sensor bundle 164 includes a plurality of sensors (e.g., cameras, or other types of sensors) to detect, measure, or otherwise acquire data based on the state of (e.g., activities occurring in) a region between sensor bundle 164 and screen 200. The state of the region between sensor bundle 164 and screen 200 may include object(s) on or over screen 200, or activit(ies) occurring on or near screen 200. In the example of FIG. 3, bundle 164 includes an RGB camera 164A (or another type of color camera 164A), an IR camera 164B, a depth camera (or depth sensor) 164C, and an ambient light sensor 164D.

In some examples, RGB camera 164A may be a camera to capture color images (e.g., at least one of still images and video). In some examples, RGB camera 164A may be a camera to capture images according to the RGB color model, which may be referred to herein as "RGB images". In some examples, RGB camera 164A may capture images with relatively high resolution, such as a resolution on the order of multiple megapixels (MPs), for example. As an example, RGB camera 164A may capture color (e.g., RGB) images with a resolution of 14 MPs. In other examples, RBG camera 164A may capture images with a different resolution. In some examples, RGB camera 164A may be pointed toward screen 200 and may capture image(s) of screen 200, object(s) disposed between screen 200 and RGB camera 164A (e.g., on or above screen 200), or a combination thereof.

IR camera 164B may be a camera to detect intensity of IR light at a plurality of points in the field of view of the camera 164B. In examples described herein, IR camera 164B may operate in conjunction with an IR light projector 166 (see FIG. 7) of system 100 to capture IR images. In such examples, each IR image may comprise a plurality of pixels each representing an intensity of IR light detected at a point represented by the pixel. In some examples, top 160 of system 100 may include an IR light projector 166 (see FIG. 7) to project IR light 167 toward screen 200 and IR camera 164B may be pointed toward screen 200. In such examples, IR camera 164B may detect the intensity of IR light reflected by screen 200, object(s) disposed between screen 200 and IR camera 164B (e.g., on or above screen 200), or a combination thereof. In some examples, IR camera 164B may exclusively detect IR light 167 projected by IR light projector 166 (e.g., as reflected from screen 200, object(s), etc., or received directly). As mentioned above, by specularly reflecting IR light (instead of diffusing IR light), the screen 200 may provide sufficient contrast when the computing system 150 determines a segmentation boundary for a foreground object disposed between the IR camera 164B and the screen 200.

Depth camera 164C may be a camera (sensor(s), etc.) to detect the respective distance(s) (or depth(s)) of portions of object(s) in the field of view of depth camera 164C. As used herein, the data detected by a depth camera may be referred to herein as "distance" or "depth" data. In examples described herein, depth camera 164C may capture a multi-pixel depth image (e.g., a depth map), wherein the data of each pixel represents the distance or depth (measured from camera 164C) of a portion of an object at a point represented by the pixel. Depth camera 164C may be implemented using any suitable technology, such as stereovision camera(s), a single IR camera sensor with a uniform flood of IR light, a dual IR camera sensor with a uniform flood of IR light, structured light depth sensor technology, time-of-flight (TOF) depth sensor technology, or a combination thereof. In some examples, depth sensor 164C may indicate when an object (e.g., a three-dimensional object) is on screen 200, which includes a surface to specularly reflect IR light, for example, away from the depth camera 164C. In some examples, depth sensor 164C may detect at least one of the presence, shape, contours, motion, and the respective distance(s) of an object (or portions thereof) placed on screen 200.

Ambient light sensor 164D may be arranged to measure the intensity of light in the environment surrounding system 100. In some examples, system 100 may use the measurements of sensor 164D to adjust other components of system 100, such as, for example, exposure settings of sensors or cameras of system 100 (e.g., cameras 164A-164C), the intensity of the light emitted from light sources of system 100 (e.g., projector assembly 184, display 152, etc.), or the like.

In some examples, sensor bundle 164 may omit at least one of sensors 164A-164D. In other examples, sensor bundle 164 may comprise other camera(s), sensor(s), or the like in addition to sensors 164A-164D, or in lieu of at least one of sensors 164A-164D. For example, sensor bundle 164 may include a user interface sensor comprising any suitable device(s) (e.g., sensor(s), camera(s)) for tracking a user input device such as, for example, a hand, stylus, pointing device, etc. In some examples, the user interface sensor may include a pair of cameras which are arranged to stereoscopically track the location of a user input device (e.g., a stylus) as it is moved by a user about the screen 200 (e.g., about region 202 of screen 200). In other examples, the user interface sensor may additionally or alternatively include IR camera(s) or sensor(s) arranged to detect infrared light that is either emitted or reflected by a user input device.

In examples described herein, each of sensors 164A-164D of bundle 164 is communicatively connected (e.g., coupled) to device 150 such that data generated within bundle 164 (e.g., images captured by the cameras) may be provided to device 150, and device 150 may provide commands to the sensor(s) and camera(s) of sensor bundle 164. Sensors 164A-164D of bundle 164 may be communicatively connected to device 150 via any suitable wired or wireless communication technology or mechanism, examples of which are described above. In the example of FIGS. 1-7, electrical conductors may be routed from bundle 164, through top 160, upright member 140, and projector unit 180 and into device 150 through leads that are disposed within mounting member 186 (as described above).

Figure 5:
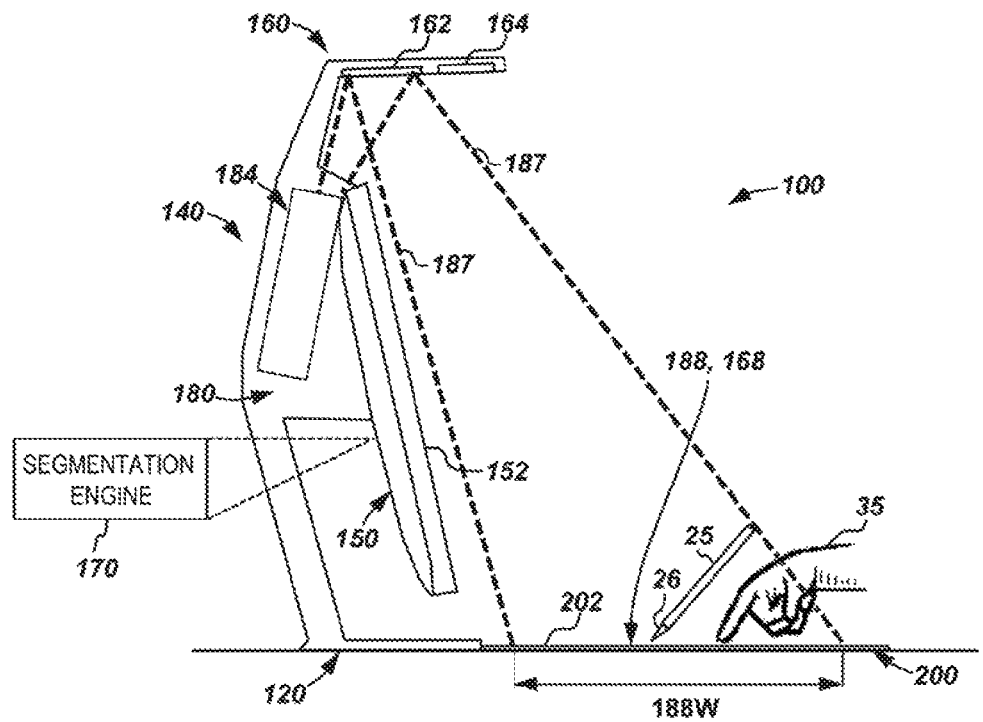
FIG. 5 is a schematic side view of the example computing system of FIG. 1 during an example operation.
Figure 6:
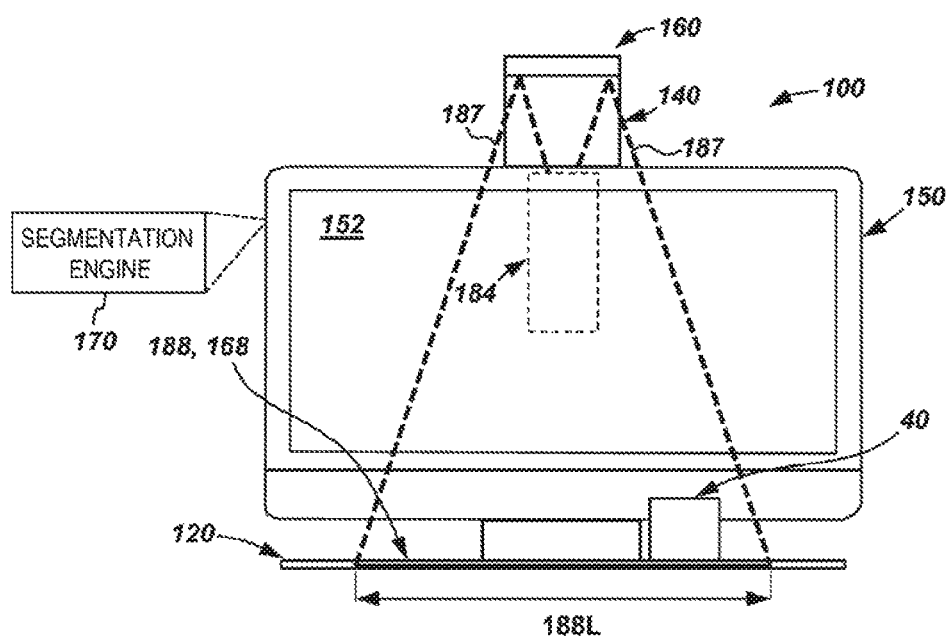
FIG. 6 is a schematic front view of the example computing system of FIG. 1 during an example operation.

Referring to FIGS. 5 and 6, during operation of system 100, projector assembly 184 may project visible light 187 to reflect off of mirror 162 towards screen 200 to thereby display visible image(s) on a projector display space 188 of screen 200. As mentioned above, by including a surface to diffuse visible light (e.g., second surface 804 in FIGS. 8A-B), the screen 200 may provide a sufficiently bright image reflected from the projector assembly 184. In the example of FIGS. 5-6, space 188 may be substantially rectangular, having a length 188L and a width 188W. In some examples, length 188L may be approximately 16 inches, while width 188W may be approximately 12 inches. In other examples, length 188L and width 188W may have different values.

In some examples, cameras 164A-164C of sensor bundle 164 are arranged within system 100 such that the field of view of each of cameras 164A-164C includes a space 168 of screen 200 that may overlap with some or all of display space 188 or may be coterminous with display space 188. In examples described herein, the field of view of cameras 164A-164C may be said to include space 168, though at times screen 200 may be at least partially occluded by object(s) on or over screen 200. In such examples, the object(s) on or over screen 200 may be in the field of view of at least one of cameras 164A-164C. In such examples, sensors of sensor bundle 164 may acquire data based on the state of (e.g., activities occurring in, object(s) disposed in) a region between sensor bundle 164 and space 168 of screen 200. For example, with regards to the IR camera 164B, with the screen 200 specularly reflecting IR light (e.g., from IR light projector 166) away from the IR camera 164B, the screen 200 may provide sufficient contrast for the computing device 150 to reliably determine the segmentation boundary of the object disposed in the region between sensor bundle 164 and space 168 of screen 200.

Figure 7:
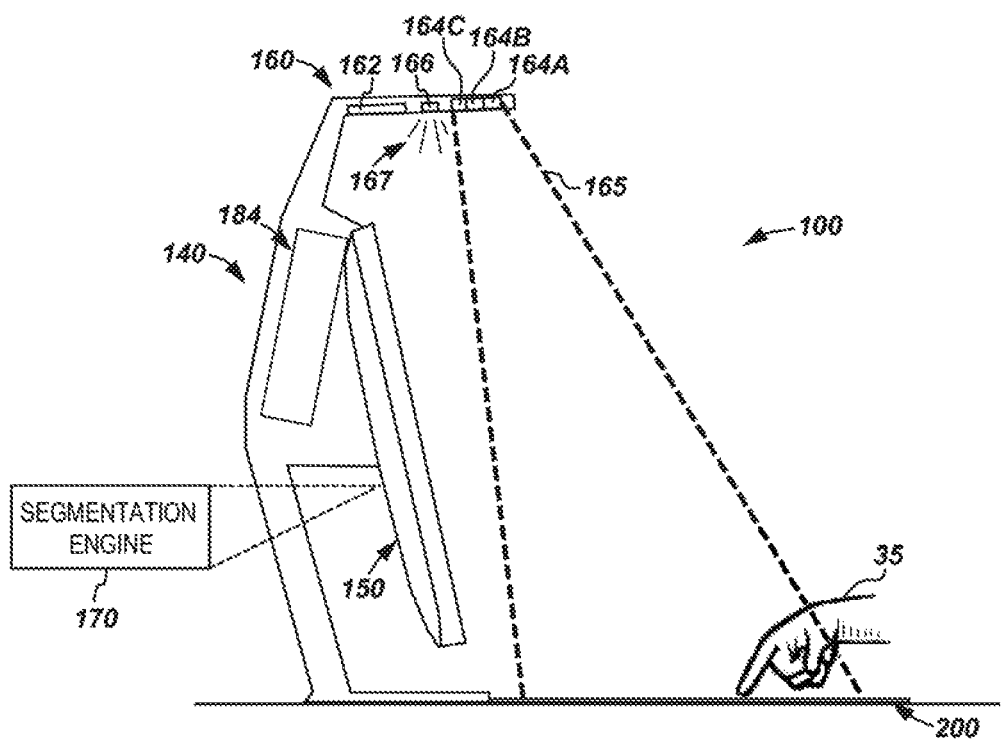
FIG. 7 is a schematic side view of the example computing system of FIG. 1 illustrating an example of image capturing.

In some examples, both space 188 and space 168 coincide or correspond with region 202 of screen 200 such that functionalities of touch sensitive region 202, projector assembly 184, and sensor bundle 164 are all performed in relation to the same defined area. A field of view 165 of cameras 164A-164C is schematically illustrated in FIG. 7. In some examples, each of cameras 164A-164C may have a slightly different field of view.

Referring again to FIGS. 8A-B, screen 200 may include a first surface 802 to specularly reflect IR light, and a second surface 804 to diffuse visible light. As an example, the first surface 802 may specularly reflect IR light away from an IR camera (e.g., IR camera 164B) such that the IR camera 164B may detect a different intensity of IR light from the projection screen 200 than from an object disposed between the camera 164B and the screen 200 that is under the same IR light projection conditions.

Figure 9A:
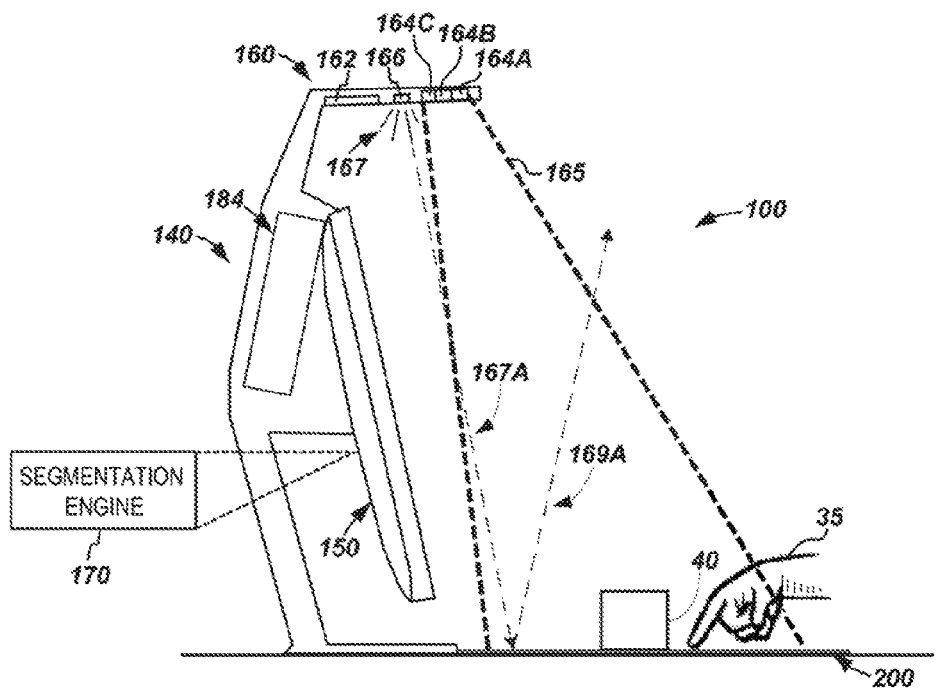
FIGS. 9A-B are schematic side views of the example computing system of FIG. 1 illustrating an example of image capturing.
Figure 9B:
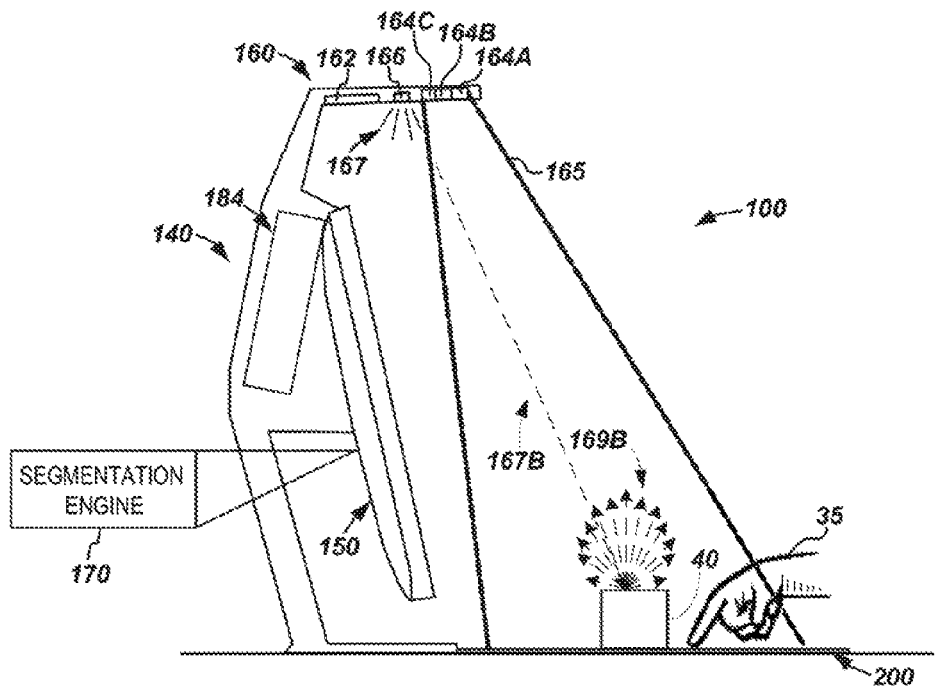

Referring to FIGS. 9A-B, IR light 167 projected by IR light projector 166 may be reflected differently (e.g., specular reflection and/or diffused reflection), based on the surface that is reflecting the IR light 167. As illustrated in FIG. 9A, the screen 200 may include a highly reflective surface (e.g., first surface 802 as illustrated in FIGS. 8A-B) for reflecting IR light from a single incoming direction 167A into a single outgoing direction 169A, which may be away or outside from the field of view 165 of IR camera 164B. However, for an object 40 not including, coated with, or otherwise prepared with such a highly reflective surface, IR light 167B projected on object 40 may produce a diffused reflection 169B of IR light, which may be within the field of view 165 of IR camera 164B, as illustrated in FIG. 9B. As a result, the camera 164B may detect a different intensity of IR light reflected from the screen 200 than from the object 40. In order to determine the segmentation boundary of the object 40, the pixels of the IR image representing portions of the screen 200 may have a different IR light intensity than pixels representing portions of the object, such that the difference in intensity values may provide sufficient contrast to reliably determine the segmentation boundary of the object 40 in the IR image. As an example, pixels of the IR image representing portions of the screen 200 may have a significantly higher and/or lower IR light intensity than pixels representing portions of the object 40. As an example, the computing device 150 may determine the segmentation boundary for an object based on multiple images captured by cameras of different types (e.g., color camera, IR camera, and/or depth camera). This may be necessary when it is difficult to accurately determine the segmentation boundary for an object based on an image captured by a single camera (e.g., IR camera 164B).

Referring now to FIGS. 5-7, device 150 may direct projector assembly 184 to project image(s) onto region 202 of screen 200. Device 150 may also display image(s) on display 152 (which may be the same as or different from the image(s) projected onto region 202 by projector assembly 184). The image(s) projected by assembly 184 may comprise information and/or images produced by software being executed by device 150. In some examples, a user may interact with the image(s) projected on region 202 and displayed on display 152 by physically engaging the touch-sensitive region 202 of screen 200 in any suitable manner, such as with user's hand 35 (e.g., via touches, taps, gestures, or other touch input), with a stylus 25, or via any other suitable user input device(s). Touch-sensitive region 202 may detect such interaction via physical engagement with region 202. Also, in some examples, assembly 184 may also project image(s) (at least partially) on objects disposed over screen 200 (e.g., hand 35, as shown in FIG. 5).

As an example, when a user interacts with region 202 of screen 200 (e.g., with a hand 35, as shown in FIG. 7), touch-sensitive region 202 may generate touch input information and provide it to device 150 through any suitable connection (examples of which are described above). In some examples, the touch input information may be provided to an operating system (OS) executing on device 150, and may further be passed by to OS to another application (e.g., program, etc.) executing on device 150. In response, the executing OS or application may alter image(s) projected by projector assembly 184, image(s) displayed on display 152, or a combination thereof. As used herein, an "application" (or "computer application") is a collection of machine-readable instructions that are executable by a processing resource. In some examples, a user may similarly interact with image(s) displayed on display 152 (which may be a touch-sensitive display), or any other input device of device 150 (e.g., a keyboard, mouse, etc.).

In some examples, sensors of sensor bundle 164 may also generate system input that may be provided to device 150 for further processing. For example, system 100 may utilize at least sensor(s) of bundle 164 and segmentation engine 170 detect at least one of the presence and location of a user's hand 35 (or a stylus 25, as shown in FIG. 5), and provide system input information representing the detected information to device 150. The provided system input information may be passed to at least one of an OS and application being executed by device 150, and may alter image(s) displayed by system 100, as described above in relation to touch input. For example, bundle 164 may include a pair of cameras or sensors that are arranged to perform stereoscopic stylus tracking (e.g., of stylus 25). In other examples, stylus 25 includes a tip 26 coated with an infrared retro-reflective coating (e.g., paint) such that tip 26 may serve as an infrared retro-reflector. In such examples, bundle 164 may include IR camera(s) (or sensor(s)), as described above, which detect IR light that is reflected off of tip 26 to enable device 150 to track the location of tip 26 as it moves across region 202. As an example, with the screen 200 specularly reflecting IR light away from the IR camera, the screen 200 may provide sufficient contrast for the device 150 to track the location of tip 26 as it moves across region 202.

In some examples, region 202 (with image(s) projected on it by assembly 184) may serve as a second or alternative touch-sensitive display within system 100. In addition, detection of interaction with image(s) displayed on region

202 may be enhanced through use of sensors of sensor bundle 164 as described above.

In some examples, system 100 may capture two-dimensional (2D) image(s) or create a three-dimensional (3D) scan of a physical object such that an image of the object may then be projected onto region 202 for further use and manipulation thereof. For example, as shown in FIG. 6, an object 40 may be placed on region 202 such that sensors of bundle 164 (e.g., at least one of cameras 164A-164C) may detect at least one of the location, dimensions, and color of object 40, to enhance the 2D image(s) or create the 3D scan thereof. In such examples, the information gathered by the sensors of bundle 164 may be provided to device 150 (e.g., an OS, application, etc.), as described above. In some examples, after receiving the information, device 150 (e.g., the OS, application, etc.) may direct projector assembly 184 to project an image of object 40 onto region 202. Object 40 may be, for example, a smartphone, a book, a document, a photo, or any other physical object.

In some examples, once object(s) are scanned by sensors of bundle 164, the background of the image representing the object may be removed (e.g., via a segmentation process as described above), and the resulting image of the foreground object may be projected onto region 202 (or shown on display 152). In such examples, images of physical objects (e.g., an object 40) may be captured, processed, and displayed on region 202 to quickly and easily create a digital version of the physical object to allow for further manipulation thereof. The background of the image representing the object 40 that is removed may correspond to at least a portion of the screen 200. With the screen 200 specularly reflecting IR light (e.g., from IR light projector 166) away from the IR camera 164B, the screen 200 may provide sufficient contrast for the computing device 150 to reliably determine the segmentation boundary of the object 40, thereby removing the background of the image.

Figure 10:
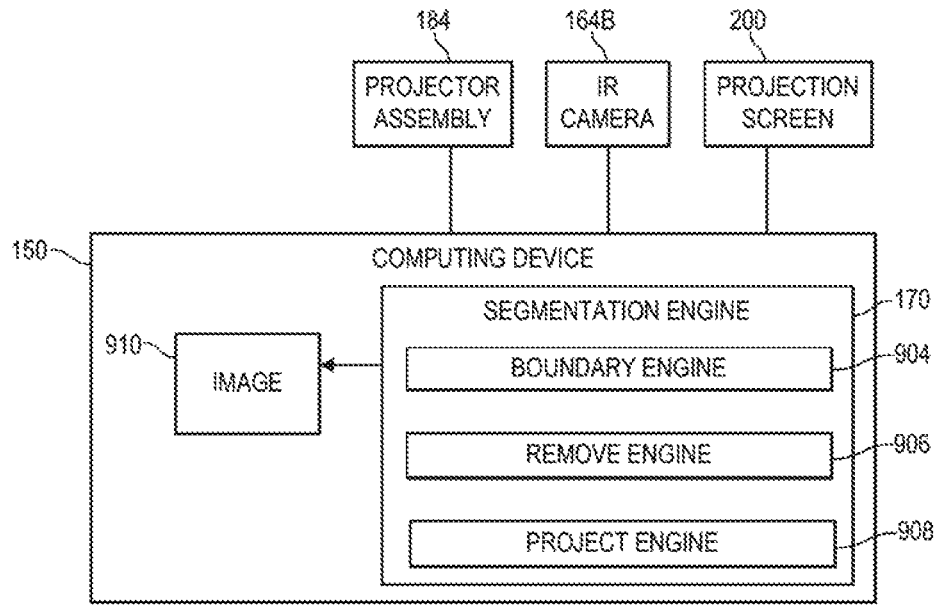
FIG. 10 is a block diagram of an example portion of the computing system of FIG. 1 comprising the segmentation engine.

FIG. 10 is a block diagram of a portion of computing system 100 of FIG. 1 comprising segmentation engine 170. In particular, FIG. 10 illustrates an example of computing device 150 that comprises segmentation engine 170 and is communicatively connected to projector assembly 184, IR camera 164B, and projection screen 200 (as described above). Although not shown in FIG. 10, computing device 150 may also be communicatively connected to other components of system 100, as described above. In the example of FIG. 10, segmentation engine 170 includes engines 904, 906, and 908. In some examples, engine 170 may include additional engine(s).

Computing device 150 (or any other computing device implementing segmentation engine 170) may include at least one processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Each of engines 170, 904, 906, 908, and any other engines of computing device 150, may be any combination of hardware and programming to implement the functionalities of the respective engine. Such combinations of hardware and programming may be implemented in a number of different ways. For example, the programming may be processor executable instructions stored on a non-transitory machine-readable storage medium and the hardware may include a processing resource to execute those instructions. In such examples, the machine-readable storage medium may store instructions that, when executed by the processing resource, implement the engines. The machine-readable storage medium storing the instructions may be integrated in the same computing device (e.g., device 150) as the processing resource to execute the instructions, or the machine-readable storage medium may be separate from but accessible to the computing device and the processing resource. The processing resource may comprise one processor or multiple processors included in a single computing device or distributed across multiple computing devices.

In some examples, the instructions can be part of an installation package that, when installed, can be executed by the processing resource to implement the engines of system 100. In such examples, the machine-readable storage medium may be a portable medium, such as a compact disc, DVD, or flash drive, or a memory maintained by a server from which the installation package can be downloaded and installed. In other examples, the instructions may be part of an application or applications already installed on a computing device including the processing resource (e.g., device 150). In such examples, the machine-readable storage medium may include memory such as a hard drive, solid state drive, or the like.

As used herein, a "machine-readable storage medium" may be any electronic, magnetic, optical, or other physical storage apparatus to contain or store information such as executable instructions, data, and the like. For example, any machine-readable storage medium described herein may be any of a storage drive (e.g., a hard drive), flash memory, Random Access Memory (RAM), any type of storage disc (e.g., a compact disc, a DVD, etc.), and the like, or a combination thereof. Further, any machine-readable storage medium described herein may be non-transitory.

In the example of FIG. 10, segmentation engine 170 may include a boundary engine 904, a remove engine 906, and a project engine 908. Boundary engine 904 may capture, from the IR camera 164B, an IR image representing an object disposed between the IR camera 164B and the projection screen 200. As an example, the IR image may be based on an intensity of IR light reflected by the object and the projection screen 200. The boundary engine 904 may determine a segmentation boundary of the object (e.g., at least one outer edge of the object based on the IR image) based at least in part on at least one boundary between a first set of IR light intensity values and a second set of IR light intensity values.

With the projection screen 200 specularly reflecting IR light, for example, away from the IR camera 164B, the boundary engine 904 may determine, for each pixel of the IR image, an IR intensity value. As an example, the IR camera 164B may detect a lesser intensity of IR light from the projection screen 200 than from the object, such that portion of the IR image representing the projection screen 200 include lesser IR light intensity values than higher IR light intensity values included in portions of the IR image representing the object. The first set of IR light intensity values may include the lesser IR light intensity values, and the second set may include the higher IR light intensity values. As such, segmentation engine 170 may determine the segmentation boundary based at least in part on at least one boundary between the lesser IR light intensity values of the IR image and the greater IR light intensity values of the IR image.

In some examples, engine 904 may estimate that a portion of the IR image represents an edge of object if the IR intensity data suggests (or otherwise indicates) the presence of an edge. In some examples, engine 904 may additionally or alternatively utilize various heuristic(s), rule(s), or the like, for estimating the presence of edges of the object based on the IR intensity of the IR image.

Remove engine 906 may remove portions of the IR image that lie outside the segmentation boundary in order to generate an image 910 of the object disposed between the IR camera 164B and the projection screen 200. As an example, the portions of the IR image that lie outside the segmentation boundary may correspond to at least a portion of the screen 200 that is captured in the IR image. With the screen 200 specularly reflecting IR light away from the IR camera 164B, the screen 200 may provide sufficient contrast for the computing device 150 to reliably determine the segmentation boundary of the object, thereby removing the background represented in the IR image. Project engine 908 may project, via the projector assembly 184, the image 910 of the object onto the projection screen 200. Creating a digital version of the physical object may allow for further manipulation of the object via the computing system 100.

Figure 11:
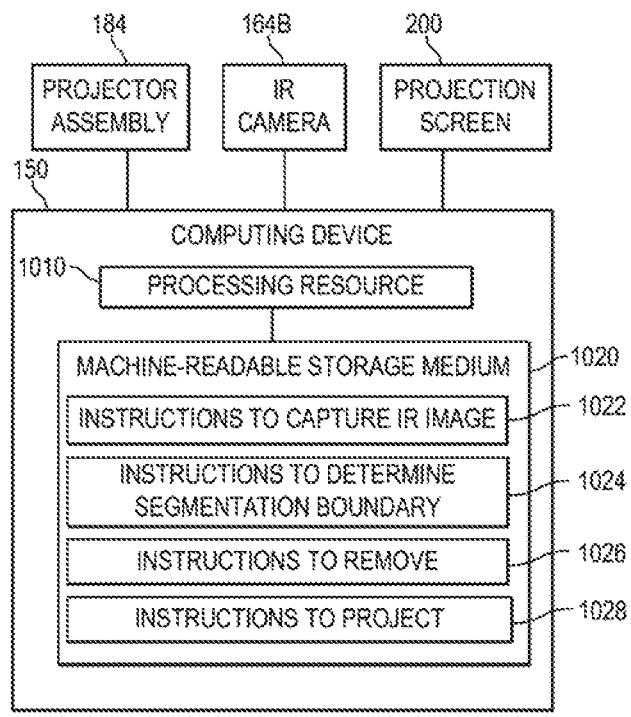
FIG. 11 is a block diagram of an example device to determine a segmentation boundary.

FIG. 11 is a block diagram of another example computing device 150 to determine a segmentation boundary. In the example of FIG. 11, computing device 150 is communicatively connected to projector assembly 184, IR camera 164B, and projection screen 200 (as described above), and includes a processing resource 1010, and a machine-readable storage medium 1020 comprising (e.g., encoded with) instructions 1022, 1024, 1026, and 1028. In some examples, storage medium 1020 may include additional instructions. In other examples, instructions 1022, 1024, 1026, 1028, and any other instructions described herein in relation to storage medium 1020, may be stored on a machine-readable storage medium remote from but accessible to computing device 150 and processing resource 1010. Processing resource 1010 may fetch, decode, and execute instructions stored on storage medium 1020 to implement the functionalities described below. In other examples, the functionalities of any of the instructions of storage medium 1020 may be implemented in the form of electronic circuitry, in the form of executable instructions encoded on a machine-readable storage medium, or a combination thereof. Machine-readable storage medium 1020 may be a non-transitory machine-readable storage medium.

In the example of FIG. 11, a computing system, such as computing system 100 described above in relation to FIG. 1, may comprise computing device 150, projector assembly 184, IR camera 164B, and projection screen 200. In some examples, instructions 1022 may capture an IR image from IR camera 164B. In examples described herein, instructions 1022 may capture the images from the camera 164B actively (e.g., by retrieving, requesting, accessing, etc., the images) or passively (e.g., receiving the images, etc.). As an example, the IR image may represent an object (e.g., object 40) disposed between the IR camera 164B and the projection screen 200.

Instructions 1024 may include instructions for determining a segmentation boundary of the object represented in the IR image. The segmentation boundary may be determined based at least in part on at least one boundary between a first set of IR light intensity values obtained from the IR image and a second set of IR light intensity values obtained from the IR image.

Instructions 1026 may include instructions for removing portions of the IR image that lie outside the segmentation boundary in order to generate a digital image of the object disposed between the IR camera 164B and the projection screen 200. As an example, the portions of the IR image that lie outside the segmentation boundary may correspond to at least a portion of the screen 200 that is captured in the IR image. With the screen 200 specularly reflecting IR light away from the IR camera 164B, the screen 200 may provide sufficient contrast for the computing device 150 to reliably determine the segmentation boundary of the object, thereby removing the background represented in the IR image.

Instructions 1028 may include instructions for projecting, via the projector assembly 184, the digital image of the object onto the projection screen 200. Creating a digital image of the physical object may allow for further manipulation of the object via the computing system 100.

Figure 12:
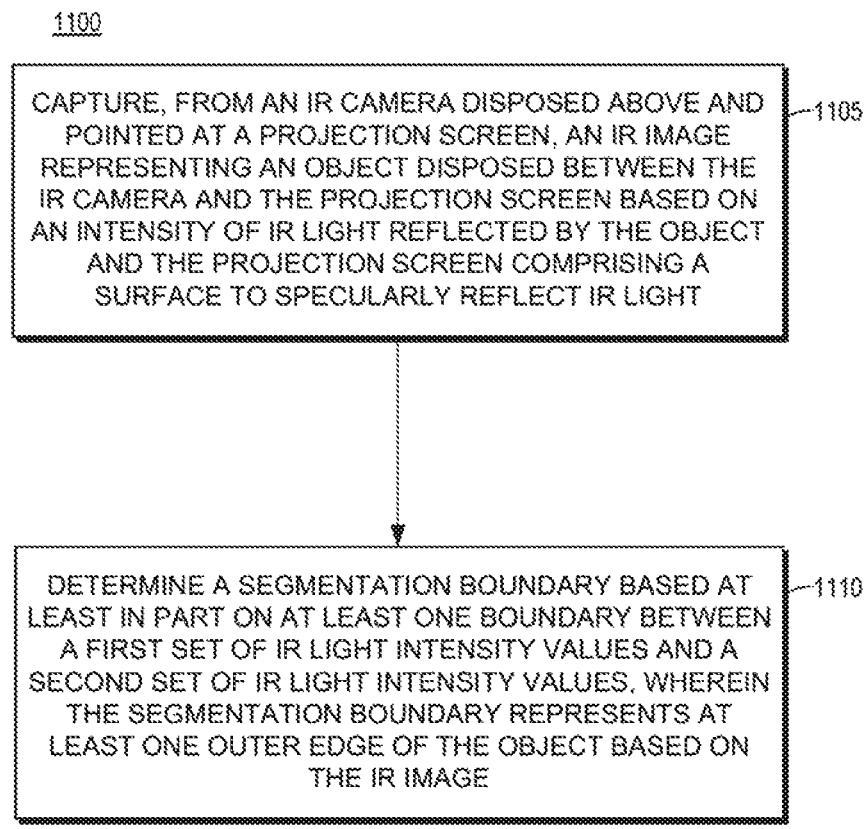
FIG. 12 is a flowchart of an example method for determining a segmentation boundary.

FIG. 12 is a flowchart of an example method 1100 for determining a segmentation boundary. Although execution of method 1100 is described below with reference to computing system 100 of FIG. 1, other suitable systems for execution of method 1100 can be utilized. Additionally, implementation of method 1100 is not limited to such examples.

At 1105 of method 1100, IR camera 164B, disposed above and pointing at projection screen 200 of computing system 100, may capture an IR image representing an object disposed between the projection screen 200 and the IR camera 164B. As an example, the IR image may be captured based on an intensity of IR light reflected by the object and the projection screen 200. The projection screen 200 may include a surface (e.g., first surface 802) to specularly reflect IR light. As an example, the IR camera 164B and the projection screen 200 may be arranged such that the projection screen 200 may specularly reflect the IR light away from the IR camera 164B.

At 1105, the computing system 100 may determine a segmentation boundary based at least in part on at least one boundary between a first set of IR light intensity values and a second set of IR light intensity values. As an example, the segmentation boundary may represent at least one outer edge of the object based on the IR image. With the projection screen 200 specularly reflecting light away from the IR camera 164B, the IR camera 164B may detect lesser intensity of IR light from the projection screen 200 than from the object such that portions of the IR image representing the projection screen 200 include lesser IR light intensity values than higher IR light intensity values included in portions of the IR image representing the object. As a result, when determining the segmentation boundary, the first set of IR light intensity values may include the lesser IR light intensity values and the second set of IR light intensity values may include the higher IR light intensity values.

Although the flowchart of FIG. 12 shows a specific order of performance of certain functionalities, method 1100 is not limited to that order. For example, the functionalities shown in succession in the flowchart may be performed in a different order, may be executed concurrently or with partial concurrence, or a combination thereof. In some examples, features and functionalities described herein in relation to FIG. 12 may be provided in combination with features and functionalities described herein in relation to any of FIGS. 1-11.

What is claimed is:
1. A computing system comprising:
  a projection screen comprising;
    a first surface to specularly reflect infrared (IR) light, and a second surface to diffuse visible light;
an IR camera disposed above and pointed at the projection screen to capture an IR image representing an object disposed between the IR camera and the projection screen based on an intensity of IR light reflected by the object and the projection screen;
a segmentation engine to determine a segmentation boundary representing at least one outer edge of the object disposed between the IR camera and the projection screen based on the IR image, wherein the segmentation engine removes portions of the IR image outside the segmentation boundary to generate an image of the object; and
a projector assembly to:
project IR light on the projection screen; and
project portions of the IR image that lie inside the segmentation boundary that correspond to the object disposed between the IR camera and the projection screen on the projection screen.

2. The system of claim 1, wherein the first surface of the projection screen is to specularly reflect the IR light away from the IR camera, and the IR light reflected by the projection screen is the IR light specularly reflected by the first surface.

3. The system of claim 2, wherein the IR camera is to detect lesser intensity of IR light from the projection screen than from the object such that portions of the IR image representing the projection screen include lesser IR light intensity values than higher IR light intensity values included in portions of the IR image representing the object.

4. The system of claim 1, wherein the segmentation engine is to determine the segmentation boundary based at least in part on at least one boundary between the lesser IR light intensity values and the higher IR light intensity values.

5. The system of claim 1, wherein the segmentation engine is to determine the segmentation boundary representing at least one outer edge of the object based on the IR image, wherein the segmentation engine comprises:
a boundary engine to determine the segmentation boundary based at least in part on at least one boundary between a first set of IR light intensity values and a second set of IR light intensity values.

6. The system of claim 1, wherein the first surface is disposed above the second surface, and wherein the visible light diffused from the second surface passes through the first surface.

7. A non-transitory machine-readable storage medium comprising instructions executable by a processing resource of a computing system comprising a projection screen, a projector assembly to project visible images on the projection screen, and an infrared (IR) camera disposed above and pointed at the projection screen, the instructions executable to:
capture, from the IR camera, an IR image representing an object disposed between the IR camera and the projection screen based on an intensity of IR light reflected by the object and the projection screen comprising a first surface to specularly reflect IR light and a second surface to diffuse visible light;
determine a segmentation boundary based at least in part on at least one boundary between a first set of IR light intensity values and a second set of IR light intensity values, wherein the segmentation boundary represents at least one outer edge of the object based on the IR image; and
project portions of the IR image that lie inside the segmentation boundary that correspond to the object disposed between the IR camera and the projection screen on the projection screen.

8. The storage medium of claim 7, wherein the instructions to determine the segmentation boundary comprise instructions to:
determine, for each pixel of the IR image, an IR intensity value, wherein the IR camera is to detect lesser intensity of IR light from the projection screen than from the object such that portions of the IR image representing the projection screen include lesser IR light intensity values than higher IR light intensity values included in portions of the IR image representing the object; and
determine the segmentation boundary, wherein the first set of IR light intensity values includes the lesser IR light intensity values and the second set of IR light intensity values includes the higher IR light intensity values.

9. The storage medium of claim 8, wherein the first surface of the screen is to specularly reflect the IR light away from the IR camera such that the IR camera is to detect the lesser intensity of the IR light from the projection screen than from the object.

10. The storage medium of claim 7, comprising instructions executable to:
remove portions of the IR image outside the segmentation boundary to generate an image of the object.

11. A method comprising:
capturing, from an infrared (IR) camera disposed above and pointed at a projection screen disposed approximately horizontal, an IR image representing an object disposed between the IR camera and the projection screen based on an intensity of IR light reflected by the object and the projection screen comprising a surface to specularly reflect IR light;
determining a segmentation boundary based at least in part on at least one boundary between a first set of IR light intensity values and a second set of IR light intensity values, wherein the segmentation boundary represents at least one outer edge of the object based on the IR image; and
projecting portions of the IR image that lie inside the segmentation boundary that correspond to the object disposed between the IR camera and the projection screen on the projection screen.

12. The method of claim 11, wherein determining the segmentation boundary comprises:
determining, for each pixel of the IR image, an IR intensity value, wherein the IR camera is to detect lesser intensity of IR light from the projection screen than from the object such that portions of the IR image representing the projection screen include lesser IR light intensity values than higher IR light intensity values included in portions of the IR image representing the object; and
determining the segmentation boundary, wherein the first set of IR light intensity values includes the lesser IR light intensity values and the second set of IR light intensity values includes the higher IR light intensity values.

13. The method of claim 12, wherein the surface of the screen is to specularly reflect the IR light away from the IR camera such that the IR camera is to detect the lesser intensity of the IR light from the projection screen than from the object.

14. The method of claim 11, comprising:
removing portions of the IR image outside the segmentation boundary to generate an image of the object.

* * * * *

UNITED STATES PATENT AND TRADEMARK OFFICE
CERTIFICATE OF CORRECTION

PATENT NO. : 10,003,777 B2
APPLICATION NO. : 15/037773
DATED : June 19, 2018
INVENTOR(S) : Kar-Han Tan et al.

It is certified that error appears in the above-identified patent and that said Letters Patent is hereby corrected as shown below:

Delete drawing sheet 5 of 8 and substitute therefor the drawing sheet 5 of 8, consisting of figs. 8A and 8B as shown on the attached page.

Signed and Sealed this
Twenty-sixth Day of March, 2019

Andrei Iancu
*Director of the United States Patent and Trademark Office*